Oct. 13, 1942.  L. C. LITTLEFIELD  2,298,394
SICKLE SHARPENER
Filed Aug. 15, 1941  2 Sheets-Sheet 1
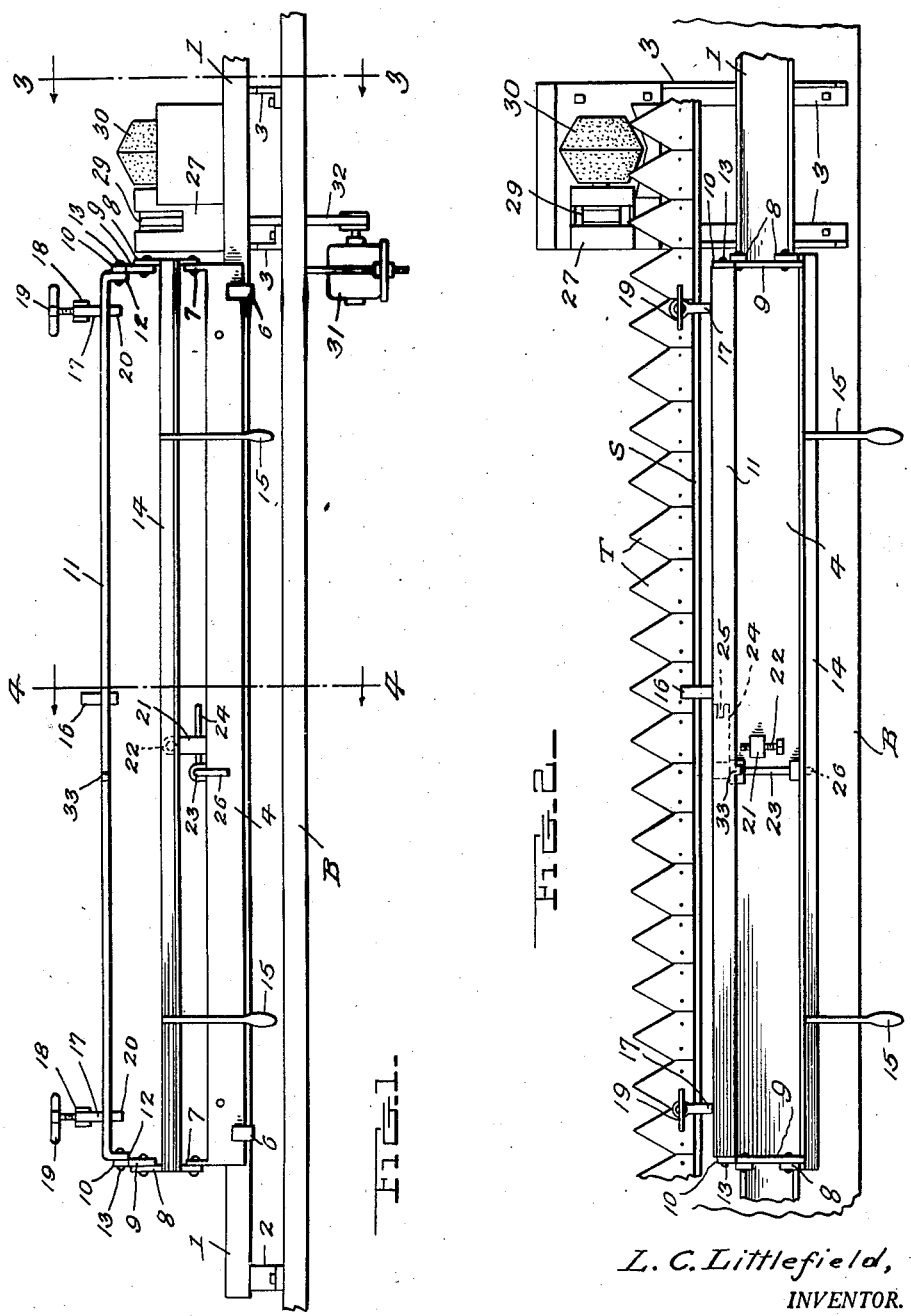
L. C. Littlefield,
INVENTOR.
BY Oct. 13, 1942.        L. C. LITTLEFIELD        2,298,394
SICKLE SHARPENER
Filed Aug. 15, 1941        2 Sheets-Sheet 2
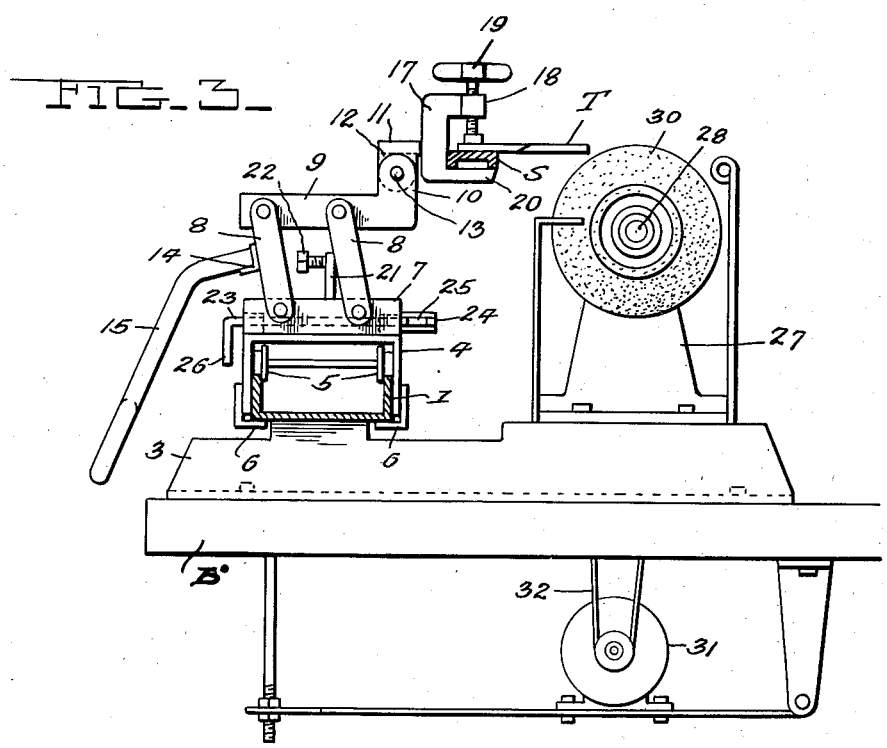
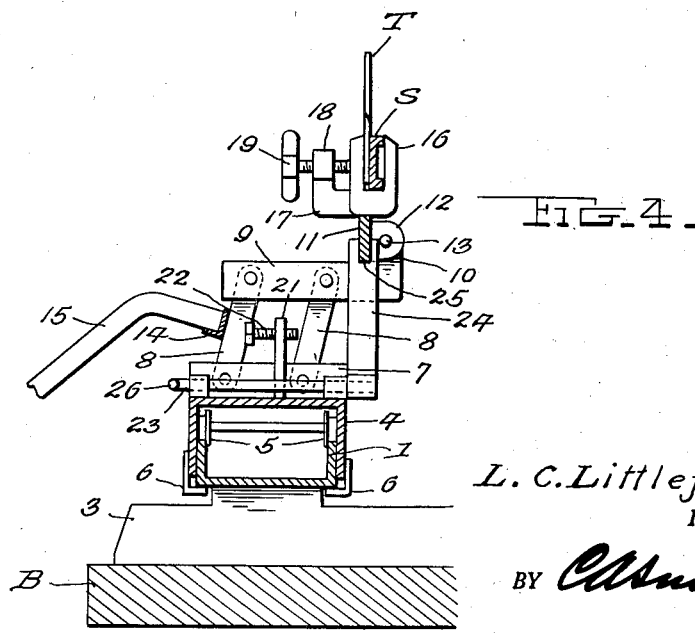
L. C. Littlefield,
INVENTOR.

Patented Oct. 13, 1942

2,298,394

UNITED STATES PATENT OFFICE 2,298,394

SICKLE SHARPENER

Leo Charles Littlefield, Clarion, Iowa

Application August 15, 1941, Serial No. 407,064

4 Claims. (Cl. 51—222)

This invention relates to a mechanism for use in sharpening the teeth of sickle bars, one of the objects being to provide a structure which is easily handled and adjusted, will act quickly to sharpen all of the teeth and holds the bar with any of its teeth in accurate position for sharpening.

Another object is to provide means for facilitating the insertion of the sickle bar into and its removal from the device.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 1 is an elevation of the machine.

Figure 2 is a plan view.

Figure 3 is an enlarged section on line 3—3, Figure 1.

Figure 4 is an enlarged section on line 4—4, Figure 1, the sickle being in raised position.

Referring to the figures by characters of reference, 1 designates a channel beam constituting the base of the machine, this beam being suitably held to a bench B or the like by a connecting bracket 2 and one end of a projecting frame 3. The base has its flanges extended upwardly to form a track or guide and is straddled by a carriage 4 having supporting wheels 5 which travel along the flanges. Retaining fingers 6 are extended from the carriage and loosely beneath the beam 1 to prevent upward displacement of the carriage 4.

The base 1 is of a length more than double the length of the sickle to be sharpened but the carriage can be somewhat shorter than the sickle. At the ends of the carriage are upstanding flanges 7 and to each of these are pivotally connected a pair of parallel upwardly extending links 8. The upper ends of the respective pairs of links are pivotally connected to side bars 9 having upwardly extended ears 10 at their front ends. A flat tiltable bar 11 is interposed between ears 10 and has ears 12 at its ends pivotally connected as at 13 to the ears 10. A connecting bar 14 is fixedly joined at its ends to one link 8 of each pair and has rigid handles 15 whereby the links 8 and bars 9 can be swung back and forth by hand.

Extending from one edge of tiltable bar 11 is a yoke 16 proportioned to straddle and support the middle portion of a sickle bar S and adjacent to each end of bar 11 is a clamp comprising a yoke 17 the upper arm 18 of which carries a clamping screw 19 for binding a sickle bar tightly against the lower arm or jaw 20 of the yoke.

A post 21 is rigidly mounted on carriage 4 and carries an adjustable stop screw 22 extending into the path of bar 14 for limiting the swinging movement of the bars 14 and 11 in one direction.

A rock shaft 23 is journaled on the carriage and carries a radial arm 24 having a slot 25 in its free end. A handle 26 extends from one end of the shaft 23 and by means thereof the shaft can be actuated to swing arm 24 upwardly or downwardly.

The frame 3 can be used for supporting a standard 27 in front of the base 1 and carriage 4, and in this standard is journaled a shaft 28 carrying a pulley 29 and an abrasive wheel 30. The periphery of wheel 30 is so shaped transversely as to properly fit between two teeth T on the sickle bar S and simultaneously grind or sharpen their diverging cutting edges.

A suitable motor 31 can be mounted adjacent to the standard 27 and drive the pulley 29 by means of a belt 32. Obviously the wheel could be driven by any other suitable means.

In practice the bar 14 is pulled back by handles 15, tiltable bar 11 is upturned and the forked or slotted end 25 of arm 24 is swung upwardly to straddle and hold the lowered edge of bar 11, this movement being limited by a stop lug 33 on bar 11. Thus the yokes 16 and 17 will be supported in upwardly extended positions and will form seats onto which the sickle bar S can be lowered. Yoke 16 guides and centers the intermediate portion of sickle bar S while the end portions can be clamped against arms 20 by screws 19.

After the sickle bar has been secured in position, the bar 11 is released from arm 24 and swung down to normal position as shown in Figures 1, 2 and 3. Bar 14 is then thrust forwardly to bring two of the teeth T into contact with the grinding surface of wheel 30. This movement can be limited by the adjustable screw 22.

The wheel is set in motion and when one edge of each of two teeth has been ground to an extent limited by screw 22, the bar 14 is pulled back to withdraw the teeth from the wheel, the carriage is shifted on its base a distance equal to the width of one tooth, and the bar is again pressed forward to bring two other toothed edges against the revolving wheel. This operation is repeated until all of the teeth have been sharpened after which bar 11 is swung up and locked and the sickle bar is released and removed.

With this machine rapid but very accurate sharpening can be effected.

What is claimed is:

1. A machine for sharpening the teeth on a sickle bar which includes a rotatable abrading wheel, a base, a carriage movable along the base and across the plane of rotation of the wheel, a structure mounted for back and forth swinging movement on the carriage, a bar carried by said structure, means thereon for engaging and holding a sickle bar with some of its teeth in contact with the wheel, said bar being tiltable upwardly relative to the carriage to lift the teeth from the wheel, and means on the carriage for engaging said tiltable bar to lock the bar and structure against movement relative to each other and to the carriage.

2. A machine for sharpening the teeth on a sickle bar which includes a rotatable abrading wheel, a base, a carriage movable along the base and across the plane of rotation of the wheel, a structure mounted for back and forth swinging movement on the carriage, said structure including upwardly extended opposed pairs of links pivotally connected to the carriage, a rigid connection between opposed links, a handle thereon, a bar pivotally connected to the upper ends of the links of each pair, a tiltable bar carried by said connecting bars, and means on the tiltable bar for engaging and holding a sickle bar.

3. A machine for sharpening the teeth on a sickle bar which includes a rotatable abrading wheel, a base, a carriage movable along the base and across the plane of rotation of the wheel, a structure mounted for back and forth swinging movement on the carriage, said structure including upwardly extended opposed pairs of links pivotally connected to the carriage, a rigid connection between opposed links, a handle thereon, a bar pivotally connected to the upper ends of the links of each pair, a tiltable bar carried by said connecting bars, means on the tiltable bar for engaging and holding a sickle bar, and means movably mounted on the carriage for engaging the tiltable bar when moved to one extreme position for holding said tiltable bar and the connecting bars against movement relative to each other and to the carriage.

4. A machine for sharpening the teeth on a sickle bar which includes a rotatable abrading wheel, a base, a carriage movable along the base and across the plane of rotation of the wheel, a structure mounted for back and forth swinging movement on the carriage, said structure including upwardly extended opposed pairs of links pivotally connected to the carriage, a rigid connection between opposed links, adjustable means cooperating with said connection for limiting the movement of the links in one direction, a handle thereon, a bar pivotally connected to the upper ends of the links of each pair, a tiltable bar carried by said connecting bars, and means on the tiltable bar for engaging and holding a sickle bar.

LEO CHARLES LITTLEFIELD.